United States Patent
Merlinge et al.

(10) Patent No.: US 12,112,280 B2
(45) Date of Patent: Oct. 8, 2024

(54) PARTICLE FILTERING METHOD AND NAVIGATION SYSTEM USING MEASUREMENT CORRELATION

(71) Applicant: OFFICE NATIONAL D'ETUDES ET DE RECHERCHES AÉROSPATIALES, Palaiseau (FR)

(72) Inventors: Nicolas Merlinge, Palaiseau (FR); Clément Audebert, Asnieres (FR); Karim Dahia, Palaiseau (FR); Bruno Herisse, Palaiseau (FR); Jean-Michel Allard, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 503 days.

(21) Appl. No.: 17/612,753

(22) PCT Filed: Apr. 10, 2020

(86) PCT No.: PCT/EP2020/060348
§ 371 (c)(1),
(2) Date: Nov. 19, 2021

(87) PCT Pub. No.: WO2020/233906
PCT Pub. Date: Nov. 26, 2020

(65) Prior Publication Data
US 2022/0245493 A1    Aug. 4, 2022

(30) Foreign Application Priority Data
May 22, 2019 (FR) ..................... 1905397

(51) Int. Cl.
*G01C 21/16* (2006.01)
*G06N 7/01* (2023.01)
*G07C 5/08* (2006.01)

(52) U.S. Cl.
CPC ............ *G06N 7/01* (2023.01); *G01C 21/165* (2013.01); *G01C 21/188* (2020.08); *G07C 5/0808* (2013.01)

(58) Field of Classification Search
CPC .... G01C 21/18; G01C 21/165; G01C 21/188; G06N 7/01; G07C 5/0808
See application file for complete search history.

(56) References Cited

U.S. PATENT DOCUMENTS

| | | | | |
|---|---|---|---|---|
| 2010/0174475 A1* | 7/2010 | Estkowski | ........... | G08G 5/0082 701/120 |
| 2014/0372026 A1* | 12/2014 | Georgy | ................. | G01S 19/47 701/469 |

OTHER PUBLICATIONS

"A Box Regularized Particle Filter for state estimation with severely ambiguous and non-linear measurements", Automatica, p. 102-110, to Merlinge et al. (2019) (Year: 2019).*

(Continued)

*Primary Examiner* — Kenneth J Malkowski
(74) *Attorney, Agent, or Firm* — NIXON & VANDERHYE (57) ABSTRACT

A method for box regularized particle filtering, used to predict a state of a system, is modified such that it can be implemented in a parallel manner. The modification concerns a step of redistributing state intervals and in particular a determination of a number of sub-intervals intended to replace each state interval. The method is particularly suitable for being implemented in a navigation system with measurement correlation, for example an aircraft navigation system using ground-correlation, and for being executed by a field-programmable or fixed-gate array circuit.

20 Claims, 2 Drawing Sheets

(56) References Cited

OTHER PUBLICATIONS

"Dual Particle Output Feedback Control based on Lyapunov drifts for nonlinear systems", 2018 IEEE Conference on Decision and Control (CDC) Miami Beach, FL, USA, Dec. 17-19, 2018 to Dahia et al. (Year: 2018).*
International Search Report and Written Opinion of the ISA for PCT/EP2020/060348, mailed Jul. 8, 2020, 13 pages.
Merlinge et al., "A Box Regularized Particle Filter for State Estimation with Severely Ambiguous and Non-Linear Measurements", Automatica, vol. 104, Mar. 12, 2019, pp. 102-110.
Merlinge et al., "A Box Regularized Particle Filter for terrain navigation with highly non-linear measurements," IFAC-PapersOnLine, 2016, vol. 49, No. 17, pp. 361-366.
Miao et al., "A new parallel implementation for particle filters and its application to adaptive waveform design," 2010 IEEE Workshop on Signal Processing Systems (SIPS), 2010, pp. 19-24.
Sankaranarayanan et al., "Algorithmic and Architectural Optimizations for Computationally Efficient Particle Filtering," IEEE Transactions on Image Processing, vol. 17, No. 5, May 2008, pp. 737-748.
Gning et al., "An Introduction to Box Particle Filtering [Lecture Notes]", IEEE Signal Processing Magazine, Jul. 2013, vol. 30, No. 4, pp. 166-171.

* cited by examiner

PARTICLE FILTERING METHOD AND NAVIGATION SYSTEM USING MEASUREMENT CORRELATION

This application is the U.S. national phase of International Application No. PCT/EP2020/060348 filed 10 Apr. 2020, which designated the U.S. and claims priority to FR Patent Application No. 1905397 filed 22 May 2019, the entire contents of each of which are hereby incorporated by reference.

BACKGROUND OF THE INVENTION

Field of the Invention

This invention relates to a particle filtering method, as well as to a computing unit and a navigation system using measurement correlation which implement such method. More particularly, the particle filtering process is of box regularized type.

Description of the Related Art

The navigation function of an aircraft includes estimating its instantaneous position, instantaneous velocity, and instantaneous orientation known as the attitude, within the navigation referential, also called the local geographic trihedron. The set of instantaneous values for the position coordinates, i.e. the latitude, longitude, and altitude of the aircraft, for the velocity coordinates, including a velocity coordinate in the North direction, a velocity coordinate in the East direction, and a downward velocity coordinate, and for the aircraft attitude angles, comprising a roll angle, a pitch angle, and a yaw angle, constitute the instantaneous state of the system formed by the aircraft. The aircraft may be an airplane, a drone, or any self-propelled aerial carrier, without limitation.

The acceleration and angular velocity of the aircraft are each measured repeatedly and at high frequency along three axes, for example at a rate of repetition of about 1000 Hz (hertz), by means of accelerometers and gyroscopes of an inertial measurement unit on board the aircraft. The navigation system then provides estimates of the position and velocity coordinates and the attitude angles of the aircraft, by integrating the results of the accelerometric and gyrometric measurements over time. However, the measurements of acceleration and angular velocity are affected by an error which is mainly composed of a bias, a scale factor, and a random process, and the accumulation of measurement errors results in an error which affects the estimate of the instantaneous state of the aircraft. This error in the estimated instantaneous state increases over time, and is commonly referred to as inertial drift. It is then necessary to associate the inertial measurement unit with at least one additional sensor, in order to correct or reduce the inertial drift.

Usual methods for correcting or reducing inertial drift consist of using geolocalization signals, such as satellite navigation signals, for example of a type such as GNSS for "Global Navigation Satellite System", or using signals produced by beacons located on the ground, for example signals of types such as radionavigation or GBAS for "Ground-Based Augmentation System", or receiving by radio a localization of the aircraft which was performed using radar. However, such methods are sensitive to interference or jamming, to the availability of coverage of the area where the aircraft is located by localization signals or communication, etc. It is therefore desirable in certain circumstances to have access on board the aircraft to an autonomous method for correcting and/or reducing inertial drift. To this purpose, it is common practice to associate a telemetry probe with the inertial measurement unit, which measures a distance between the aircraft and the ground. This telemetry probe can be a radio altimeter, a laser rangefinder, etc., without limitation. It measures the distance between the aircraft and the ground in a direction which may or may not be fixed relative to the aircraft. When this distance measurement direction can vary, its orientation relative to the aircraft is known. The inertial measurement unit is then also associated with a computing unit which correlates the results of successive measurements carried out by the telemetry probe with the instantaneous state of the aircraft as estimated by the inertial measurement unit. More precisely, a characterization of the area overflown by the aircraft is stored on board the aircraft, for example in the form of a relief map which associates a relief height value with each pair of latitude and longitude values. Such a relief map record may be in the form of a table, with the latitude and longitude which constitute the table entries, and the relief height values which constitute the responses read in the table. Alternatively, the characterization of the overflown area can be stored in the form of an analytical function that calculates the relief height values based on the latitude or longitude values, or in any other suitable form. Then, for each new estimate of the instantaneous position of the aircraft which is produced by the inertial measurement unit, a value for the distance which should exist between the aircraft and the ground is obtained by querying for the characterization of the overflown area as stored on board the aircraft, in accordance with the estimated position of the aircraft. Optionally, the value of the aircraft-ground distance can result from a calculation which combines the estimated position of the aircraft with the result(s) of one or more searches for the characterization of the overflown area stored on board the aircraft, in particular when the measurement direction of the telemetry probe is oblique relative to the altitude axis. Such a calculation is known to those skilled in the art, so there is no need to repeat it here. The value of the aircraft-ground distance which is thus estimated is then compared to the measurement result delivered by the telemetry probe. Such a method is commonly referred to as ground-correlation navigation. Several variants have been proposed, but some of them are very sensitive to the existence of non-linearities in the ground profiles. Put another way, they have the disadvantage of a lack of robustness in their efficiency in converging towards the actual state of the aircraft, depending on possible ground profiles.

Ground-correlation navigation methods based on a box regularized particle filter, or BRPF, allow greater robustness in correcting inertial drift, and are compatible with the existence of ground non-linearities and ambiguities. The article by Merlinge, N., Dahia, K., Piet-Lahanier, H., Brusey, J., & Horri, N. which is entitled "A Box Regularized Particle Filter for state estimation with severely ambiguous and non-linear measurements", Automatica (2019), Vol. 104, pp. 102-110, describes such a method. Each of these methods again consists of iteratively calculating an instantaneous state of the aircraft based on a previously determined last state, by using measurements carried out by the inertial measurement unit, and by correlating the obtained result with the distance measurement performed by the telemetry probe, the distance measurement being reconstructed with the characterization of the terrestrial relief map which is on board the aircraft. However, a box regularized particle filter does this by manipulating nine-dimensional state intervals where each state of the aircraft is composed of three position coordinates, three velocity coordinates, and three attitude angles as described above. In addition, a weight value with probabilistic significance is associated with each state interval: the weight of each state interval corresponds to the probability that the actual state of the aircraft is within that state interval. However, these ground-correlation navigation methods based on particle filters have not yet been implemented for actual aircraft, due to the very large computational resources that are required. Indeed, for many aeronautical applications, the ground-correlation navigation method used must be implemented by a computing unit of the field-programmable gate array type, or FPGA. However, circuits of this type are still too limited in capacity.

In a known manner, a method of box regularized particle filtering comprises at least one execution of a sequence which includes the following steps:

/1/ a prediction step, comprising a predicting of subsequent state intervals, each subsequent state interval being obtained by applying at least one propagation rule to one among a plurality of previous state intervals, each state interval possibly being multidimensional;

/2/ a step of measuring the actual state;

/3/ a step of contraction of at least one of the subsequent state intervals, as a function of at least one measurement result of the actual state that was obtained in step /2/;

/4/ a weight update step, comprising an assigning of a weight to each subsequent state interval as a function of a size of this subsequent state interval as resulting from step /3/, of a size of the same subsequent state interval as resulting from step /1/ before step /3/, and of a weight of the previous state interval from which this subsequent state interval resulted during step /1/; and /5/ a step of redistributing the subsequent state intervals, comprising a replacing of at least one of the subsequent state intervals i by $n_i$ sub-intervals obtained from a division of subsequent state interval i, i being an integer index numbering the subsequent state intervals and $n_i$ being a number of the sub-intervals which replace this subsequent state interval i, each sub-interval being intended to constitute a previous state interval for a subsequent iteration of the sequence of steps /1/ to /5/.

Step /5/ is commonly performed using a multinomial drawing method. One such method consists in drawing points randomly and repetitively within a one-dimensional segment, in order to determine the number $n_i$ of sub-intervals intended to replace subsequent state interval i, as a function of the weights, denoted $w_i$, of all subsequent state intervals as updated in step /4/. The drawing segment is composed of a juxtaposition of basic segments whose individual lengths correspond one-to-one to the weights of subsequent state intervals. The number $n_i$ of sub-intervals which will replace subsequent state interval i is then proportional to the number of points randomly drawn which are part of the basic segment whose length is equal to the weight of subsequent state interval i. If the value of $n_i$ thus determined for one of the subsequent state intervals is zero, this subsequent state interval is deleted, otherwise subsequent state interval i is divided into $n_i$ sub-intervals, the value obtained for $n_i$ being statistically greater when the weight of subsequent state interval i resulting from step /4/ is high. However, such a multinomial drawing method cannot be performed in parallel between all the subsequent state intervals, so it generates a bottleneck in executing the sequence of steps /1/ through /5/. In addition, it does not guarantee a constant run time for step /5/. Indeed, this multinomial drawing method requires comparing each of a series of randomly drawn numbers, corresponding to the abscissas of the points introduced previously, to the progressive sums of the weights $S_i = \Sigma_{k=1,\ldots,i} w_i$, in the order of increasing values of i until the first of these progressive sums greater than the random number is identified. In principle, the number of tests comparing each random number to one of the progressive sums of the weights is not predictable. However, particularly for a drift correction of the inertial measurement unit which is carried out by ground-correlation, it is essential that the run time of step /5/ be controlled, to guarantee periodicity in updating the estimate of the aircraft state in real time.

SUMMARY OF THE INVENTION

From this situation, an object of the invention is to optimize the use of a box regularized particle filter, in particular so that this filter can be implemented on board an aircraft. In other words, an object of the invention is to provide a method for hardware implementation of a box regularized particle filter. Beyond that, an object of the invention is to contribute to a method for box regularized particle filtering being implemented by an FPGA type of circuit.

Another object of the invention is to allow the use of a box regularized particle filter, while ensuring that the computation time required for each iteration of estimating the instantaneous state of the system is less than a controlled maximum duration. In particular, an object of the invention is to make it possible to parallelize at least part of the step of redistributing subsequent state intervals, which is particularly demanding in computing resources.

To achieve at least one or of these or other objects, a first aspect of the invention provides a method for box particle filtering in order to predict a state of a system, which comprises steps /1/ to /5/ mentioned above, but wherein step /5/ is modified. According to the invention, instead of the multinomial drawing method, step /5/ comprises an initializing of the number of sub-intervals $n_i$, and comprises the sequence of following sub-steps /5-1/ to /5-4/ which is performed for each of the subsequent state intervals alternatively used as a reference interval:

/5-1/ initially adopting the reference interval as retained state interval;

/5-2/ obtaining a number which is between 0 and 1, called random factor, by a drawing method considered to be random, and selecting one of the subsequent state intervals, different or not different from the reference interval, as a comparison interval, by a selection method considered to be random; and /5-3/ if the result of multiplying the random factor by the weight of the reference interval, as updated in step /4/, is less than the weight of the comparison interval, also as updated in step /4/, then replacing the previously retained state interval by the comparison interval; sub-steps /5-2/ and /5-3/ being repeated several times for each subsequent state interval used as a reference interval, then /5-4/ incrementing by one the number of sub-intervals intended to replace the state interval that is retained at the end of the repetition of sub-steps /5-2/ and /5-3/.

Each subsequent state interval is then replaced in a sub-step /5-5/ by sub-intervals which are obtained from a division of that subsequent state interval, in accordance with the number of sub-intervals which results for this same subsequent state interval from all executions of sub-step /5-4/.

Such an execution of step /5/ can easily be parallelized, since it only performs comparison tests which use the weights of paired state intervals. In addition, this mode for executing step /5/ guarantees a run time which is deterministic, in particular because the number of comparison tests to be carried out does not depend on the value of each random factor chosen in sub-step /5-2/. When step /5/ is performed in a parallelized mode, it can be referred to as a step of parallelized redistribution of subsequent state intervals.

In the context of the invention, drawing/selection method considered as random is understood to mean a method assumed to provide drawing/selection results which comply with or substantially comply with a law of uniform probability. Such methods are known, including methods commonly called pseudo-random methods.

In various implementations of the invention, the following preferences and improvements may advantageously be used, independently of one another or with several combined:

sub-steps /5-2/ and /5-3/ may be repeated a number of times which is between 1 and 100 for each subsequent state interval used as a reference interval;

in step /5/, the number $n_i$ of sub-intervals which are obtained from a division of subsequent state interval i may be systematically initialized to zero before carrying out the sequence of sub-steps /5-1/ to /5-4/ for this subsequent state interval i used as the reference interval. Alternatively, an initialization of the number $n_i$ to zero may be applied if the weight of subsequent state interval i as resulting from step /4/ is zero, otherwise an initialization of the number $n_i$ to the value of one may be applied. Such a differentiated initialization of the numbers $n_i$ ensures that each state interval i is maintained during the redistribution step /5/ if its weight as resulting from step /4/ is non-zero;

step /5/ may be performed only if a representativeness criterion is not satisfied by the weights of the subsequent state intervals as updated in step /4/. In particular, a representativeness criterion of a type referred to as N-effective or of an entropy type can be used;

in step /4/, the updated weight of each subsequent state interval may be equal to the weight of the previous state interval from which resulted this subsequent state interval in step /1/, multiplied by the size of the subsequent state interval as resulting from step /3/, and divided by the size of the subsequent state interval as resulting from step /1/ before the application of step /3/ to this subsequent state interval;

step /5/ may further comprise the following additional sub-step, performed after each subsequent state interval has been replaced by sub-intervals obtained by dividing this subsequent state interval:

/5-6/ a kernel-smoothing sub-step, during which at least one of the sub-intervals and a weight associated with this sub-interval are modified according to a probability kernel in order to form a previous state interval intended to be used for the subsequent iteration of the sequence of steps /1/ through /5/;

at each execution of sub-step /5-2/, the random factor may be obtained by an LFSR type of method, for "linear-feedback shift-register". Such an LFSR method may also be used for randomly selecting each comparison interval. LFSR methods may in particular be used to generate a pseudo-random number according to a uniform kernel, in particular a Galois LFSR method;

sub-steps /5-1/ to /5-5/, and sub-step /5-6/ if applicable, may be carried out in parallel for all of the subsequent state intervals that are each used as the reference interval; and the system may be an aircraft, the state of the system then comprising coordinates of the position, velocity, and attitude of the aircraft during flight, and each measurement of the actual state of the system providing a value of a distance which exists between the aircraft and a point on the ground.

A second aspect of the invention provides a computing unit, this computing unit comprising at least a first input suitable for receiving results of repeated measurements of acceleration and angular velocity of a system, and a second input suitable for receiving results of repeated measurements of the actual state of the system, in addition to the measurements of acceleration and angular velocity. The computing unit is then arranged to execute a method of box regularized particle filtering in accordance with the first aspect of the invention. In this manner, the computing unit outputs a series of state intervals with respective weights, the weight associated with each of the state intervals corresponding to a probability value that the actual state of the system is within that state interval.

Such a computing unit may be a field-programmable gate array type of circuit, or FPGA, a fixed-gate array type of circuit known under the acronym DSP for "Digital Signal Processor", or a central processing unit known under the acronyms CPU for "Computer Processing Unit" or RISC for "Reduced Instruction Set Computer".

The computing unit may comprise several computing sub-units intended to be dedicated one-to-one to the subsequent state intervals, and suitable for executing in parallel sub-steps /5-1/ to /5-5/, and optionally also sub-step /5-6/, for all subsequent state intervals.

A third aspect of the invention proposes a navigation system with measurement correlation, adapted for being carried on board a vehicle and which comprises:

an inertial measurement unit, adapted for iteratively measuring accelerations and angular velocities of the vehicle, and for deducing, using the measurement results for the accelerations and angular velocities, subsequent state intervals respectively based on several previous state intervals, each state of the vehicle comprising position, velocity, and attitude coordinates of this vehicle;

a measurement system, adapted for iteratively measuring at least one characteristic of a actual state of the vehicle; and a computing unit in accordance with the second aspect of the invention, and which is suitable for reducing at least one drift in position, velocity, and/or attitude of the inertial measurement unit, by using measurements results of the characteristic of the actual state of the vehicle which are provided by the measurement system.

Finally, a fourth aspect of the invention provides a vehicle which comprises a navigation system with measurement correlation in accordance with the third aspect of the invention. Such a vehicle may be an aircraft, in particular an airplane, a flying drone, or any self-propelled aerial carrier, or a vehicle capable of ground movement, in particular a drone that can move about on the ground, a ship, a submarine, a spacecraft, in particular a probe, a satellite, etc., without limitation. Depending on the case, the measurement system may be a telemetry probe intended for measuring a distance between the vehicle and a point on the ground, a system for locating landmarks or stars, a sonar for measuring the height of water below the ship or submarine, etc.

BRIEF DESCRIPTION OF THE DRAWINGS

The features and advantages of the invention will be more clearly apparent in the detailed description below of non-limiting examples of its implementation, with reference to the appended figures, among which.

DESCRIPTION OF THE PREFERRED EMBODIMENTS

Figure 1:
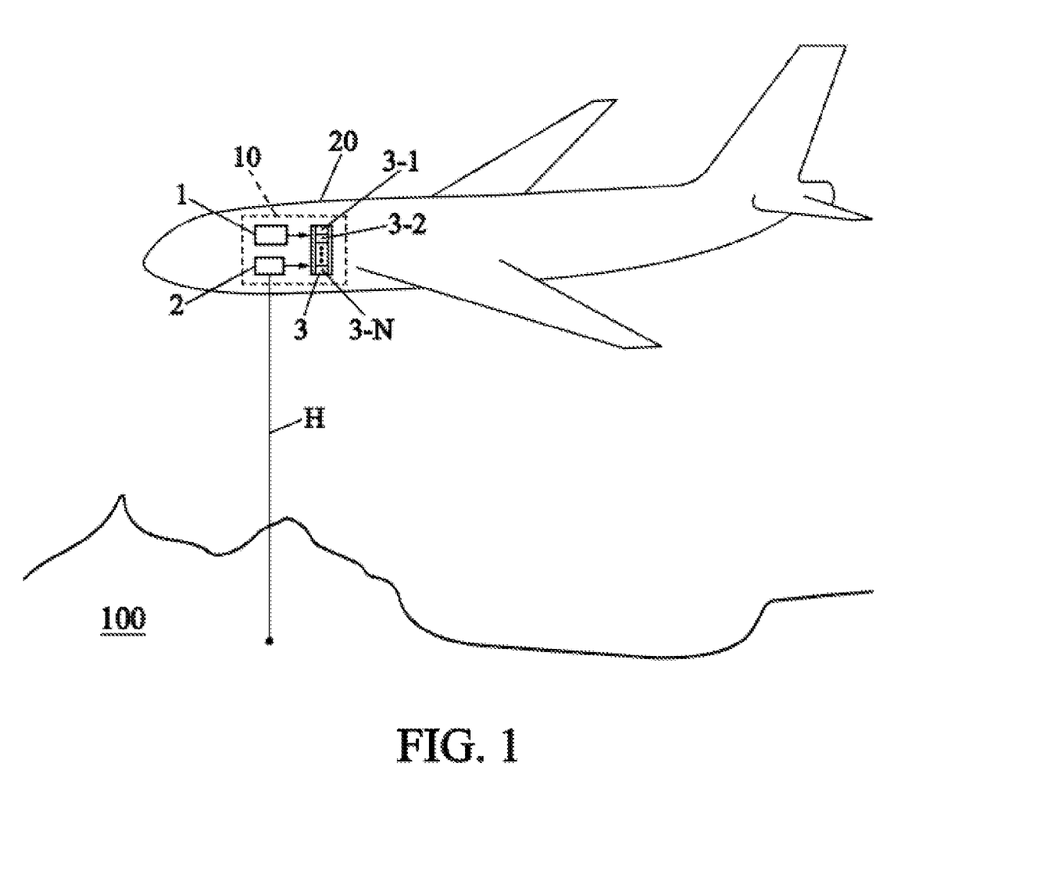
FIG. 1 shows an aircraft equipped with an inertial measurement unit readjusted by ground-correlation in accordance with the invention.

For clarity sake, the dimensions of the elements symbolically represented in [FIG. 1] do not correspond to actual dimensions, nor to actual dimensional ratios. In addition, the invention is described in a non-limiting example for the case of an application to an aircraft, but it is understood that it can be applied to any vehicle which is provided with a navigation system with measurement correlation, whether this vehicle is for use on land, in the air, at sea, in space, etc.

According to [FIG. 1], an aircraft 20 is equipped with a navigation system with measurement correlation designated by the reference 10. The navigation system 10 comprises an inertial measurement unit 1, a telemetry probe 2, and a computing unit 3. In a known manner, the inertial measurement unit 1 repeatedly performs measurements of three acceleration coordinates and three angular velocity coordinates of the aircraft 20, using accelerometers and gyroscopes, not shown. Furthermore, the telemetry probe 2 repeatedly performs measurements of the distance H which exists between the ground 100 and the aircraft 20. This distance H is measured in a direction which may be fixed with respect to the aircraft 20, for example perpendicularly to a reference plane of the aircraft. Optionally, the telemetry measurement direction may be variable with respect to the aircraft 20, but in such a case this measurement direction is controlled and appropriately taken into account, in a known manner. The distance H therefore varies as a function of the terrestrial relief which is overflown by the aircraft 20, and as a function of its altitude and attitude. Although the description is limited below to the sole case of values of the distance H that are results from measurements performed in addition to those of the inertial measurement unit 1, corresponding to the case of ground-correlation navigation, it is understood that other additional measurements can alternatively be used instead of or in addition to those of the distance H. Finally, the invention is compatible with commercially available inertial measurement unit and telemetry probe models. In particular, the inertial measurement unit may be based on MEMS, for "Micro-Electro-Mechanical System", four-prong tuning forks, ring laser gyroscope, etc., and the telemetry probe may be a radio altimeter, a laser rangefinder, etc.

Each possible state for the aircraft 20 may be composed of three values of spatial coordinates which identify a position for the aircraft, for example in the terrestrial referential, three velocity values each according to one of the spatial coordinates, and three angular values to identify an orientation of the aircraft, for example three values of Euler angles, for a total of nine state coordinates. Under these conditions, a state interval for the aircraft 20 is formed by a combination of nine one-dimensional intervals which each separately relate to one of the state coordinates. Such a state interval is called a box in the jargon of those skilled in the art.

The method is initialized by providing several initial state intervals, each associated with a weight which indicates a probability value that the actual state of the aircraft 20 is initially within this initial state interval. Thus, N initial state intervals are provided, N being an integer, for example equal to 16 or 32, preferably less than or equal to 128. Each initial state interval is individually associated with a weight value, which may be equal to 1/N.

The method then consists of successive iterations of a sequence of steps, each new execution of the sequence of steps producing an updating of the state intervals, with updated weight values associated one-to-one with the updated state intervals. In addition, each new execution of the sequence of steps is performed based on the state intervals and their associated weight values as provided by the immediately preceding execution of the sequence of steps.

Figure 2:
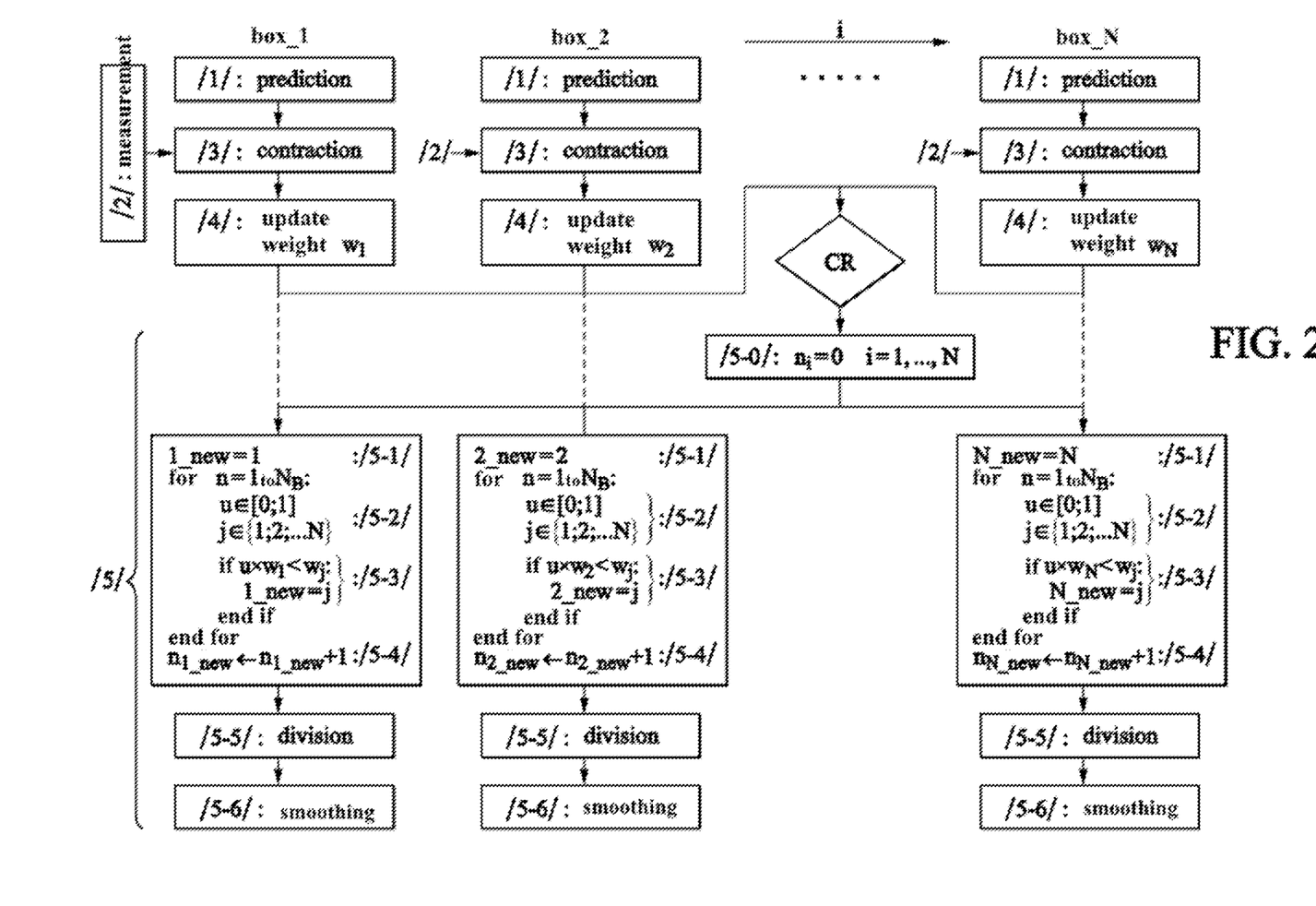
FIG. 2 is a diagram showing the sequence of steps in a method according to the invention, with parallelized execution of the steps.

Each sequence of steps comprises a prediction step, denoted /1/ in [FIG. 2], a measurement step denoted /2/, a contraction step denoted /3/, a step /4/ of updating the weight of each state interval, and a step /5/ of redistributing the state intervals. Steps /1/ and /3/ through /5/ are executed for each state interval, preferably in a parallel manner for all the state intervals. Thus, within the computing unit 3, a first computing sub-unit, denoted 3-1 in [FIG. 1], may be dedicated to performing steps /1/ and /3/ to /5/ for a first of the state intervals, denoted box_1 in [FIG. 2], a second computing sub-unit 3-2 may be dedicated to executing steps /1/ and /3/ to /5/ for a second of the state intervals, denoted box_2, etc. . . . , an Nth computing sub-unit 3-N may be dedicated to executing steps /1/ and /3/ to /5/ for the Nth of the state intervals, denoted box_N. Since step /5/ produces a redistribution of the state intervals as resulting from step /3/, it is preferably executed so as to maintain a constant number of state intervals. Then the computing unit 3 can be designed and sized to comprise the N computing subunits 3-1, 3-2, . . . , 3-N.

For each state interval, step /1/, called the prediction step, consists of collecting the results of the last acceleration and angular velocity measurements, as delivered by the inertial measurement unit 1. Optionally, the results of several measurements made by the inertial measurement unit 1 since the previous execution of the sequence of steps /1/ to /5/ may be collected. For each of the state intervals, step /1/ also comprises calculating an evolution of this state interval during the period of time which has elapsed between the two executions of step /1/, relating to the previous iteration and to the new current iteration of the sequence of steps /1/ through /5/. The principle of calculating such an evolution in each state interval, based on the results of the acceleration and angular velocity measurements, is assumed to be known to those skilled in the art. Reference may be made on this subject to the article by Merlinge, N., Dahia, K., Piet-Lahanier, H., Brusey, J., & Horri, N. which is entitled "A Box Regularized Particle Filter for state estimation with severely ambiguous and non-linear measurements", Automatica (2019), Vol. 104, pp. 102-110. This step /1/ results in a translation, usually accompanied by a change in length, of each one-dimensional interval which relates to one of the state coordinates of the aircraft 20. In the general part of this description, each state interval as existing at the moment when the execution of step /1/ begins has been called the previous state interval, and this state interval as modified by step /1/ has been called the subsequent state interval.

Step /2/, called the measurement step, consists in collecting the result of the last distance measurement H as outputted by the telemetry probe 2. Optionally, the results of several last measurements carried out by the telemetry probe 2 since the previous execution of step /2/, during the previous iteration of the sequence of steps /1/ through /5/, can be collected.

Step /3/, called the contraction step, consists in reducing the size of each state interval according to incompatibilities that would exist between parts of this state interval and the last results for the distance measurement H collected in step /2/. Typically, the six position and attitude coordinates of the aircraft 20, as they can vary within each state interval as re-determined in step /1/, are combined with relief height values read in a ground map which is stored, in order to obtain an estimate of the distance H associated with each state. Such a calculation may be carried out in the known manner which has been reminded at the start of this description. The thus-estimated distance H is compared with the result of the measurement from step /2/. In general, an implicit equation may be implemented to convert each state of the aircraft 20 into a distance value H, using the stored ground map. But such an equation, called the observation equation by those skilled in the art, may be difficult to invert locally, so it can be advantageous to model its inverse function by an analytical function portion and a tabulated function portion. Those skilled in the art may also refer to the article by Merlinge et al., Automatica 104 (2019), cited above, concerning step /3/ which is not the object of the improvement to the method provided by the invention.

Step /4/, called the updating step, consists of updating the weight of each state interval as resulting from step /3/. For example, a new value of the weight of state interval box_1 may be equal to the value of the weight of state interval box_1 as it existed before this update, multiplied by the size of state interval box_1 as resulting from the contraction step /3/, and divided by the size of state interval box_1 as resulting from the prediction step /1/ before the application of the contraction step /3/. Similar weight update calculations may be performed separately for state interval box_2, . . . , box_N. Other weight update formulas may alternatively be adopted. Optionally, the weight values as resulting from one of these formulas may additionally be corrected, for example by multiplying them by a non-zero common factor to ensure that their sum is equal to one.

The prediction /1/, contraction /3/, and weight updating /4/ steps just described are advantageously carried out in parallel for state intervals box_1, box_2, . . . , box_N by the computing subunits 3-1, 3-2, . . . , 3-N. This results in saved computation time.

The purpose of step /5/ is to redistribute the state intervals as resulting from step /3/, in order to obtain better statistical representativeness of the states which are possible for the aircraft 20. Execution of this step /5/ may be subjected to the result of an optional test designated by CR in [FIG. 2]. This test consists of determining whether a representativeness criterion is satisfied by the state intervals with their respective weight values. It concerns all weights $w_i$ as updated in step /4/, where $w_i$ is the weight associated with state interval box_i, i being an integer index varying from 1 to N. A first representativeness criterion that may be used is the one known as the N-effective criterion. This criterion is satisfied if $(\Sigma_{i=1 \ldots N} w_i^2)^{-1} < \theta_{eff} \cdot N$, where $\theta_{eff}$ is an adjustment parameter for the N-effective criterion, its value between 0 and 1. Another representativeness criterion that is also possible is the one known as the entropy criterion: it is satisfied if $\log(N) + \Sigma_{i=1 \ldots N} w_i \cdot \log(w_i) > \theta_{ent} \cdot N$, where $\theta_{ent}$ is an adjustment parameter for the entropy criterion, its value between 0 and 1. However, other representativeness criteria also known to those skilled in the art may alternatively also be used. The step of redistributing the state intervals /5/ is then applied if the representativeness criterion is not met.

Step /5/ first comprises determining a division number $n_i$ which is assigned to state interval box_i, with the index i which again numbers the state intervals from 1 to N. It then begins by initializing all the division numbers $n_i$ to zero. This initialization sub-step is denoted /5-0/ in [FIG. 2]. Sub-steps /5-1/ through /5-4/ which are to be subsequently performed within step /5/ result in determination of the division numbers $n_i$. Then step /5/ comprises sub-steps /5-5/ and /5-6/ for determining $n_i$ state sub-intervals which will replace state interval box_i for a complete new execution of the sequence of steps /1/ to /5/.

The method of determining the division numbers $n_i$ is now described for the generic state interval box_i. It is based on the weights of all state intervals box_1, box_2, . . . , box_N, as updated in step /4/. [FIG. 2] indicates this method in the form of pseudocode for i=1, 1=2, and i=N. The value of the weight $w_i$ is compared with those of the respective weights of $N_B$ state intervals which are selected randomly or pseudo-randomly, being multiplied each time by a random or pseudo-random factor denoted u and within the interval [0; 1]. State interval i has been called the reference interval in the general part of this description, and each of the $N_B$ randomly or pseudo-randomly selected state intervals has been called the comparison interval, with its weight being denoted $w_j$ generically, j being an index numbering the $N_B$ comparison intervals. The comparison intervals are selected separately and independently for each reference interval box_i. Then, each time the inequality $u \cdot w_i < w_j$ is satisfied for one of the comparison intervals box_j, state interval box_j is retained in a memory location in place of the state interval previously retained also when state interval box_i is used as the reference interval. Thus, the determination of the division numbers $n_i$ comprises the following sequence of sub-steps, for each state interval box_i used as the reference interval:

a sub-step /5-1/, in which the index of the state interval retained in memory, denoted i_new, is initialized to the value i;

a sub-step /5-2/, in which a number u between 0 and 1 is drawn randomly or pseudo-randomly, the values 0 and 1 being possible, and a comparison interval box_j is selected randomly or pseudo-random among state intervals box_1, box_2, . . . , box_N, including box_i; and a sub-step /5-3/ in which the state interval index value retained in memory is replaced by j if the condition $u \cdot w_i < w_j$ is satisfied.

Sub-steps /5-2/ and /5-3/ are repeated $N_B$ times for each state interval box_i used as a reference interval, for example a number of times $N_B$ which is fixed between 4 and 11, then the division number of the state interval which is designated by the index as retained in memory after the $N_B$ iterations of sub-steps /5-2/ and /5-3/, is incremented by one. In other words, an additional sub-step /5-4/ consists of replacing the value $n_{i\_new}$ by $n_{i\_new}+1$. This sub-step /5-4/ is therefore executed N times in all, once for each state interval box_i used as a reference interval. Sub-steps /5-1/ to /5-4/ are advantageously executed in parallel for all state intervals used alternatively as the reference interval, by the computing sub-units 3-1, 3-2, ..., 3-N which are respectively dedicated to state intervals box_1, box_2, ..., box_N of the column arrangement of [FIG. 2].

Each number u and each comparison interval box_j can be randomly or pseudo-randomly selected using various known methods for random number generation. Among these methods, those using a linear-feedback shift-register (LFSR) may be preferred, including a uniform kernel LFSR method, in particular a Galois LFSR method.

Each state interval box_i is then divided into $n_i$ sub-intervals in sub-step /5-5/, for example by one of the ways described in the following articles:

"An introduction to box particle filtering [lecture notes]" by Gning, A., Ristic, B., Mihaylova, L., & Abdallah, F., IEEE Signal Processing Magazine (2013), Vol. 30 (4), pp. 166-171; and "A Box Regularized Particle Filter for state estimation with severely ambiguous and non-linear measurements" by Merlinge, N., Dahia, K., Piet-Lahanier, H., Brusey, J., & Horri, N., Automatica (2019), Vol. 104, pp. 102-110.

Optionally, the division numbers $n_i$ may be corrected beforehand to ensure that their sum is equal to N. Such a correction may proceed by canceling out the division numbers $n_i$ which are the smallest, or by applying a linear correction and then rounding to all the division numbers $n_i$, or by a combination of these two correction methods, or by using any other usual method. If one of the division numbers $n_i$ is zero, the corresponding state interval box_i is discarded from the rest of the method. The sub-intervals which thus result from each state interval box_i, at the end of the corresponding execution of sub-step /5-5/, may be individually assigned a weight which is equal to $w_i/n_i$. Optionally, the weight values thus obtained for the N sub-intervals may be corrected, for example by multiplying them by a new constant factor to ensure that their sum is equal to one. It is also possible to perform step /5/ only for those of state intervals box_i which have a non-zero weight. The sub-intervals are then assigned one-to-one to the computing sub-units 3-1, 3-2, ..., 3-N, to replace the state intervals as resulting from the executions of step /3/, and to be used as new state intervals.

Finally, the optional sub-step /5-6/ consists in correcting the new state intervals and their associated weight values, as resulting from sub-step /5-5/. These modifications may consist of translations of the basic intervals of the state coordinates, to improve the probability distribution they constitute with their associated weights for the actual state of the aircraft 20. Kernel smoothing methods, also called kernel regularization, including those involving uniform or Gaussian kernel regularization, can be used for this purpose, as described in the article by Merlinge et al., Automatica 104 (2019).

Sub-step /5-5/ may therefore also be executed in a parallelized manner for all state intervals box_i, as well as sub-step /5-6/ for all the newly adopted state intervals. Thus, with the exception of the CR test to evaluate the representativeness criterion, all steps and sub-steps of the method can be executed in parallel, using the N computing sub-units 3-1, 3-2, ..., 3-N within computing unit 3.

The updated state intervals, as resulting from sub-step /5-5/ or possibly from sub-step /5-6/, with their associated weights, constitute the result of the box particle filtering method for the last execution of the sequence of steps /1/ to /5/, providing a probability distribution that characterizes the actual state of the aircraft 20. These updated state intervals, associated with their respective weights, can then be used as state intervals for a new execution of the sequence of steps /1/ to /5/.

It is understood that the invention can be reproduced by modifying secondary aspects of the embodiments described in detail above, while retaining at least some of the cited advantages. Among such possible modifications, the following are cited without limitation:

- alternative algorithms may be used for certain steps or sub-steps of the method;
- the inertial measurement unit may be used as a source for measuring the complete state of the vehicle. The state of the system as considered for the invention then comprises three acceleration values and three angular velocity values, according to the three spatial coordinates, in addition to three spatial coordinate values which identify a position for the vehicle, three velocity values, and three attitude angular values. In this case, each state of the system comprises values for fifteen state coordinates;
- an a-priori model for the state evolution dynamics may be used, which can take into account commands that are applied to the engine(s) and to the attitude control system of the vehicle; and
- the computing unit may be a processor with an ARM structure, a multi-core processor, one or more graphics processor(s), etc., instead of an FPGA or DSP type of chip.

Finally, the invention may be applied to fields other than aeronautics. For example, a method of box regularized particle filtering in accordance with the invention may also be implemented for a ground vehicle, a surface maritime vessel, a submarine, a satellite, or a space probe, each time using a referential and actual state measurements that are appropriate.

The invention claimed is:

1. A method of box regularized particle filtering, for predicting a state of a system, comprising at least one execution of a sequence which includes the following steps:
   /1/ a prediction step, comprising a predicting of subsequent state intervals, each subsequent state interval being obtained by applying at least one propagation rule to one among a plurality of previous state intervals;
   /2/ a step of measuring a actual state of the system;
   /3/ a step of contracting at least one of the subsequent state intervals, as a function of at least one measurement result of the actual state that was obtained in step /2/;
   /4/ a weight update step, comprising an assigning of a weight to each subsequent state interval as a function of a size of said subsequent state interval as resulting from step /3/, of a size of said subsequent state interval as resulting from step /1/ before step /3/, and of a weight of the previous state interval from which said subsequent state interval resulted during step /1/; and
   /5/ a step of redistributing the subsequent state intervals, comprising a replacing of at least one of the subsequent state intervals i by $n_i$ sub-intervals obtained from a division of subsequent state interval i, i being an integer index numbering the subsequent state intervals and $n_i$ being a number of the sub-intervals which replace said subsequent state interval i, each sub-interval being intended to constitute a previous state interval for a subsequent iteration of the sequence of steps /1/ to /5/, wherein step /5/ comprises an initializing of the number of sub-intervals $n_i$, and comprises the sequence of following sub-steps /5-1/ to /5-4/ which is performed for each of the subsequent state intervals alternatively used as a reference interval:

/5-1/ initially adopting the reference interval as retained state interval;

/5-2/ obtaining a number which is between 0 and 1, called random factor, by a drawing method considered to be random, and selecting one of the subsequent state intervals, different or not different from the reference interval, as a comparison interval, by a selection method considered to be random;

/5-3/ if a result of multiplying the random factor by the weight of the reference interval, as updated in step /4/, is less than the weight of the comparison interval, also as updated in step /4/, then replacing the previously retained state interval by the comparison interval;

sub-steps /5-2/ and /5-3/ being repeated several times for each subsequent state interval used as a reference interval, then /5-4/ incrementing by one the number of sub-intervals intended to replace the state interval that is retained at the end of the repetition of sub-steps /5-2/ and /5-3/; and each subsequent state interval then being replaced in a sub-step /5-5/ by sub-intervals obtained from a division of said subsequent state interval, in accordance with the number of sub-intervals which results for said subsequent state interval from all executions of sub-step /5-4/.

2. The method of claim 1, wherein sub-steps /5-2/ and /5-3/ are repeated a number of times which is between 1 and 100 for each subsequent state interval used as a reference interval.

3. The method of claim 2, wherein step /5/ is performed only if a representativeness criterion is not satisfied by the weights of the subsequent state intervals as updated in step /4/.

4. The method of claim 2, wherein, in step /4/, the updated weight of each subsequent state interval is equal to the weight of the previous state interval from which resulted said subsequent state interval in step /1/, multiplied by the size of the subsequent state interval as resulting from step /3/, and divided by the size of the subsequent state interval as resulting from step /1/ before the application of step /3/ to said subsequent state interval.

5. The method of claim 2, wherein step /5/ further comprises the following additional sub-step, performed after each subsequent state interval has been replaced by sub-intervals obtained by dividing said subsequent state interval:

/5-6/ a kernel-smoothing sub-step, during which at least one of the sub-intervals and a weight associated with said sub-interval are modified according to a probability kernel in order to form a previous state interval intended to be used for the subsequent iteration of the sequence of steps /1/through /5/.

6. The method of claim 2, at each execution of sub-step /5-2/, the random factor is obtained by a linear-feedback shift-register type of method, and/or the comparison interval is selected by a linear-feedback shift-register type of method.

7. The method of claim 1, wherein step /5/ is performed only if a representativeness criterion is not satisfied by the weights of the subsequent state intervals as updated in step /4/.

8. The method of claim 7, wherein, in step /4/, the updated weight of each subsequent state interval is equal to the weight of the previous state interval from which resulted said subsequent state interval in step /1/, multiplied by the size of the subsequent state interval as resulting from step /3/, and divided by the size of the subsequent state interval as resulting from step /1/ before the application of step /3/ to said subsequent state interval.

9. The method of claim 7, wherein step /5/ further comprises the following additional sub-step, performed after each subsequent state interval has been replaced by sub-intervals obtained by dividing said subsequent state interval:

/5-6/ a kernel-smoothing sub-step, during which at least one of the sub-intervals and a weight associated with said sub-interval are modified according to a probability kernel in order to form a previous state interval intended to be used for the subsequent iteration of the sequence of steps /1/through /5/.

10. The method of claim 1, wherein, in step /4/, the updated weight of each subsequent state interval is equal to the weight of the previous state interval from which resulted said subsequent state interval in step /1/, multiplied by the size of the subsequent state interval as resulting from step /3/, and divided by the size of the subsequent state interval as resulting from step /1/ before the application of step /3/ to said subsequent state interval.

11. The method of claim 10, wherein step /5/ further comprises the following additional sub-step, performed after each subsequent state interval has been replaced by sub-intervals obtained by dividing said subsequent state interval:

/5-6/ a kernel-smoothing sub-step, during which at least one of the sub-intervals and a weight associated with said sub-interval are modified according to a probability kernel in order to form a previous state interval intended to be used for the subsequent iteration of the sequence of steps /1/through /5/.

12. The method of claim 1, wherein step /5/ further comprises the following additional sub-step, performed after each subsequent state interval has been replaced by sub-intervals obtained by dividing said subsequent state interval:

/5-6/ a kernel-smoothing sub-step, during which at least one of the sub-intervals and a weight associated with said sub-interval are modified according to a probability kernel in order to form a previous state interval intended to be used for the subsequent iteration of the sequence of steps /1/ through /5/.

13. The method of claim 1, wherein, at each execution of sub-step /5-2/, the random factor is obtained by a linear-feedback shift-register type of method, and/or the comparison interval is selected by a linear-feedback shift-register type of method.

14. The method of claim 1, wherein sub-steps /5-1/ through /5-5/ are carried out in parallel for all of the subsequent state intervals that are each used as the reference interval.

15. The method of claim 1, wherein the system is an aircraft, the state of the system comprises coordinates of position, velocity, and attitude of the aircraft during flight, and wherein each measurement of the actual state of the system provides a value of a distance which exists between the aircraft and a ground point.

16. A computing unit, comprising at least a first input suitable for receiving results of repeated measurements of acceleration and angular velocity of a system, a second input suitable for receiving results of repeated measurements of an actual state of the system, in addition to the measurements of acceleration and angular velocity, and the computing unit being arranged to execute a method of box regularized particle filtering in accordance with claim 1, so as to output a series of state intervals with respective weights, the weight associated with each of the state intervals corresponding to a probability value that the actual state of the system is within said state interval.

17. The computing unit of claim 16, of the field-programmable gate array type, fixed-gate array type, or central processing unit type.

18. The computing unit of claim 16, comprising several computing sub-units intended to be dedicated one-to-one to the subsequent state intervals, and suitable for executing in parallel at least sub-steps /5-1/ to /5-5/, for all subsequent state intervals.

19. A navigation system with measurement correlation, adapted for being carried on board a vehicle, comprising:
- an inertial measurement unit, adapted for iteratively measuring accelerations and angular velocities of the vehicle, and for deducing, using measurement results for the accelerations and angular velocities, subsequent state intervals respectively based on several previous state intervals, each state of the vehicle comprising position, velocity, and attitude coordinates of said vehicle;
- a measurement system, adapted for iteratively measuring at least one characteristic of an actual state of the vehicle; and
- a computing unit in accordance with claim 9, and adapted for reducing at least one drift of the inertial measurement unit among a position drift, a velocity drift, and an attitude drift, by using measurement results of the characteristic of the actual state of the vehicle which are provided by the measurement system.

20. A vehicle comprising a navigation system with measurement correlation which is in accordance with claim 19.

* * * * *